(Model.)
A. E. COHN.
SPRING ROLLER FOR SASH BALANCES.
No. 344,626. Patented June 29, 1886.
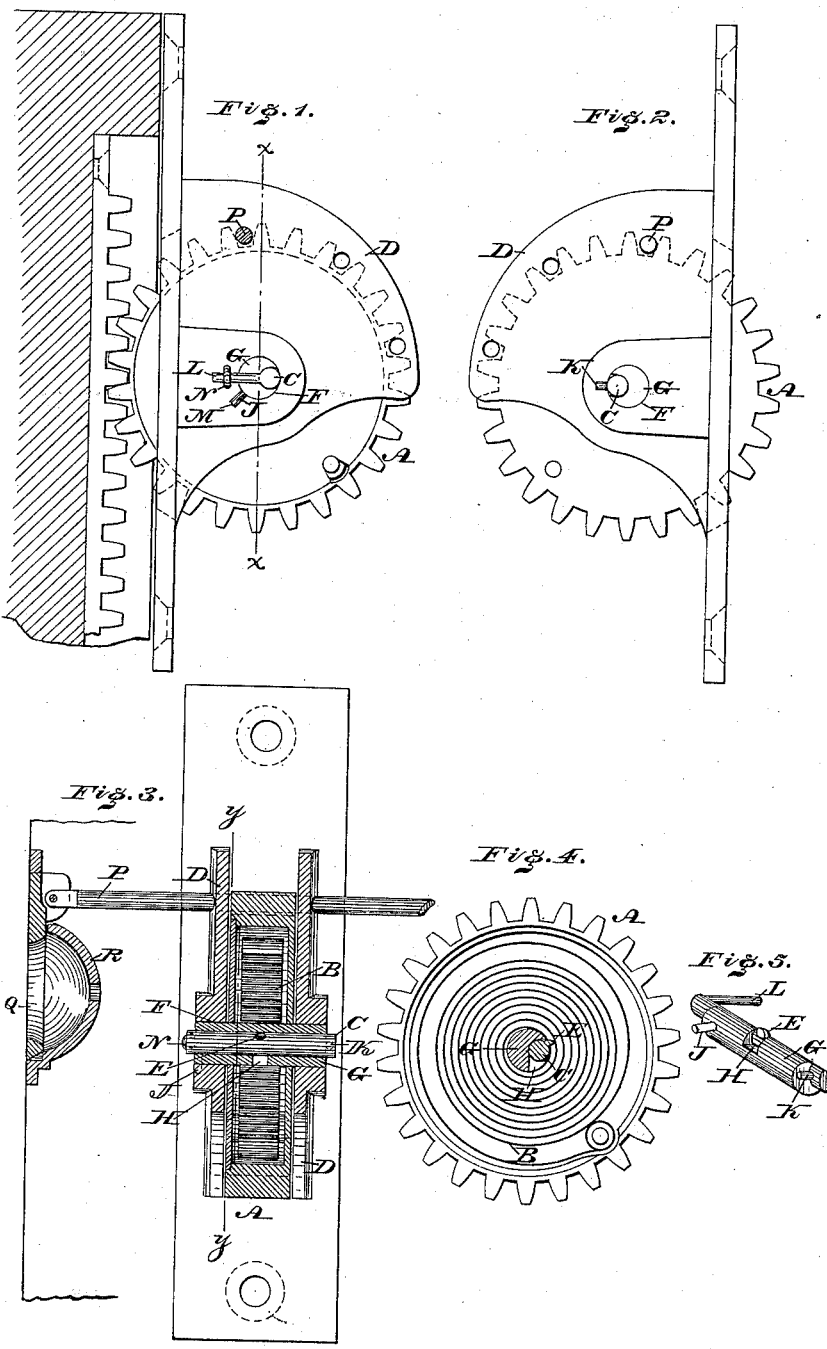
WITNESSES:
INVENTOR: A. E. Cohn
BY ATTORNEY

UNITED STATES PATENT OFFICE.

ABRAHAM E. COHN, OF PHILADELPHIA, PENNSYLVANIA, ASSIGNOR OF ONE-HALF TO A. AND H. MYERS, OF SAME PLACE.

SPRING-ROLLER FOR SASH-BALANCES.

SPECIFICATION forming part of Letters Patent No. 344,626, dated June 29, 1886.

Application filed January 7, 1886. Serial No. 187,833. (Model.)

*To all whom it may concern:*

Be it known that I, ABRAHAM E. COHN, a citizen of the United States, residing in the city and county of Philadelphia, State of Pennsylvania, have invented a new and useful Improvement in Spring-Rollers, which improvement is fully set forth in the following specification and accompanying drawings.

The invention is serviceable for spring-rollers employed for sash-balances, shade or curtain fixtures, and other purposes.

Figures 1 and 2 represent elevations of opposite sides of a spring-roller embodying my invention. Fig. 3 represents a section thereof in line $x\,x$, Fig. 1. Fig. 4 represents a section in line $y\,y$, Fig. 3. Fig. 5 is a perspective view of a detached portion.

Similar letters of reference indicate corresponding parts in the several figures.

My invention consists of novel means whereby the pivot-pin or axis of a spring-roller may be readily connected with and disconnected from the spring, and the pin or axis may be conveniently applied and removed from its bearings.

Referring to the drawings, A represents a roller, and B a coiled spring within the same. C represents the pivot-pin or axis of the roller, and D the bearings therefor, said bearings being shown of the form of a box or frame which is secured to the place of service of the roller. The spring B is secured at one end to the roller A, and at the other end to the axis C by means of a spur or tooth, E, which enters an opening in the inner end of the spring. The openings F in the bearings D for the axis C are of greater diameter than that of the axis, and said axis is fitted eccentrically in a bushing, G, which latter is of cylindrical form, and, with the axis C, fully occupies the openings F, it being noticed that the axis is rotatable within the bushing. At the center of the bushing is a recess, H, to receive the spur E when the spring is disconnected from the axis, said spur, however, projecting beyond the periphery of the bushing when it engages with the spring. Projecting from the periphery of the bushing, at one end thereof, is a lug or pin, J, and from the axis at the end opposite to the pin J is a lug or pin, K. Projecting from the axis at the end opposite to the pin K is a pin, L, it being noticed that the length of the axis is such that when it is in position the pins K L are on opposite sides of the bearing D, and on the outside of the same. The pin J, however, occupies a recess, M, in the bearing D, and serves to prevent rotation of the bushing. It will be seen that when the axis is turned so that the spur E enters the recess H, the bushing and axis may be passed through the openings F in the box or bearing D and the center of the spring, the pin J entering the recess M of the bearing. The axis is now turned, whereby the spur E leaves the recess H and enters the opening in the inner end of the spring, so as to engage with said end, thus connecting the spring with the axis, whereby also, when the spring is wound, it retains its hold on said spur E. The rotation of the axle also causes the pin K to pass clear of the end of the bushing, as seen in Fig. 2, and at the same time the pin L, which was before clear of the bushing, is at the end thereof, thus preventing lateral motion of the axis of the roller, and consequently retaining the same in place. In order to prevent rotation of the axle a staple, N, may be employed, the same straddling the pin L and entering openings in the adjacent bearings D. When the staple is withdrawn, the axle may be rotated, thus returning the pin K against the end of the bushing, it being noticed that said pin does not now project beyond the diameter of the bushing. The spur E leaves the end of the spring and enters the recess H, the pin K and spur E thus presenting no obstacle to the passage of the axis and bushing through the opening F of the bearing. Consequently said axis and bushing may be readily withdrawn, the spring thus being disconnected from its axis, and the latter from its bearings. The roller is shown with a toothed periphery, which meshes with a rack, the latter being employed when the invention is applied to a sash-balance, in which case said rack is attached to a sash. When it is desired to prevent rotation of the roller, whether wound or unwound, I employ a pin, P, which is passed through openings in the bearings D, and between adjacent teeth of the roller, thus locking the same. A handle, Q, is pivoted to the end of the pin, the same being of the form of a ring, which, when not required, is folded flush in a socket, R, which is connected with a frame or the wood-work adjacent to the roller.

Having thus described my invention, what I claim as new, and desire to secure by Letters Patent, is—

1. A spring-roller having an axis which is connectible with the same and fitted in a bushing, and provided with pins on opposite ends for preventing displacement, substantially as described.

2. A spring-roller having an axis which is connectible with the same and provided with pins at opposite ends, in combination with a bushing which receives said axis eccentrically, and is connectible with the bearings of the axis, said bushing having a recess to receive the connecting device of the spring and axis when the same are disconnected, substantially as described.

3. In a spring-roller, the pivot-pin or axis provided with the spur E, in combination with the cylindrical bushing G, having slot H, and the coil-spring B, having an opening at one end for the said spur E, all substantially as described.

4. In a spring-roller, the pivot-pin C, rotatably fitted in the bushing G, the latter having the pin J, in combination with the bearing D, having recess M, all substantially as and for the purpose set forth.

A. E. COHN.

Witnesses:
JOHN A. WIEDERSHEIM,
A. P. GRANT.